Patented May 15, 1934

1,959,313

UNITED STATES PATENT OFFICE 1,959,313

PROCESS FOR THE PREPARATION OF CATALYSTS

Walter E. Vail, Charleston, W. Va., assignor to E. I. du Pont de Nemours & Company, Wilmington, Del., a corporation of Delaware No Drawing. Application April 26, 1933, Serial No. 668,040

13 Claims. (Cl. 23—233)

The present invention relates to a new and improved process for the preparation of catalysts and more particularly to the preparation, from metal sulfates, of catalysts which are substantially free from sulfur compounds.

One of the major problems before the worker in catalytic syntheses is that of increasing the useful life of catalysts. In many processes involving their employment, it has been found almost impossible to extend catalyst life over an economic period due primarily to impurities either left in the catalysts as a result of their method of preparation or absorbed during use. For instance, in the preparation of hydrogen by the catalytic reaction of steam and carbon monoxide, according to the equation:

$$CO + H_2O = H_2 + CO_2$$

gaseous fuels, such as water gas, coal gas, coke oven gas, etc., are utilized to supply carbon monoxide for the reaction, steam being injected into these gases prior to passing them over the catalyst. Such gases are necessarily contaminated with many impurities, such, for instance, as sulfur and sulfur compounds, which give considerable trouble due to poisoning of the catalyst and thus shortening its life. In the hydrogenation of oils, fats, and other organic compounds, like difficulties have been encountered, due either to impurities in the hydrogen used in the hydrogenation or impurities in the compounds being hydrogenated. Furthermore, while in many instances the presence of sulfate, as such, in catalysts for the water gas or hydrogenation reactions, is not of itself believed to be a catalyst poison, it has been found that the presence of sulfates frequently results in lowered catalytic activity, possibly due to reduction of sulfate to sulfide under conditions of high temperature and pressure, it being generally recognized that hydrogen sulfide is a poison for many metallic catalysts.

An object of the present invention is to provide an improved process for the preparation of metal catalysts. Another object of the invention is to provide new and improved catalysts which have extended life under adverse conditions. A further object of the invention is to provide from inexpensive metal sulfate raw materials a catalyst which is substantially free from sulfur. A still further object of the invention is to provide a process for manufacturing metal catalysts by dissolving a metal salt in a suitable solvent, precipitating a compound of the metal, washing, redissolving the precipitate in a solvent which may either be driven from the catalyst during its ignition or which, if not volatile under these conditions, will not injure the catalyst when present therein, reprecipitating, rewashing, and finally preparing the catalyst by drying, igniting, and possibly reducing in the usual manner. Other objects and advantages will hereinafter appear.

In the commercial preparation of catalysts for various reactions, including the water gas reaction, hydrogenation reactions, etc., it has been known that the presence of any sulfur compound is particularly poisonous to many of the metallic catalysts which are suitable for these reactions, such, for example, as copper or nickel catalysts, and thus greatly shortens the life span of these catalysts. In the preparation of such catalysts, however, the sulfates of the metals are generally considerably less expensive than the non-sulfur containing salts thereof. It, accordingly, is of considerable economic advantage to prepare the catalysts from sulfates, providing, of course, they can be prepared substantially free from sulfur compounds. It is well known, however, that in the preparation of catalysts from metal sulfates involving the step of solution of sulfate, followed by precipitation with a hydroxide or other suitable precipitant, and ultimate washing of the precipitate thus obtained, it is impossible to remove completely from the precipitate, by washing or other known means, the last traces of sulfur, usually present as sulfate.

I have found, nevertheless, a method whereby metal catalysts can be prepared from the metal sulfates so that the resulting catalyst contains substantially no sulfur compounds, and as a result of its freedom from sulfur compounds the catalyst, prepared in accord with the hereinafter designated process, has an exceptionally long life and can be used advantageously in many types of catalytic reactions.

One feature of my invention for the preparation from metal sulfates of catalysts which are substantially free from sulfur compounds may be carried out in the following manner:

The sulfates of the metals which the catalyst is to contain are dissolved in a suitable solvent, usually water. They are then precipitated from the solution with a suitable precipitant, such as, for example, a soluble hydroxide, carbonate, chromate, or oxalate. The resulting precipitate is then thoroughly washed and subsequent thereto dissolved by a suitable reagent; e. g. an acid, such as nitric, chromic, acetic, etc., which is either volatilized during subsequent treatment of the precipitate to form the catalyst, or if remaining in the finished catalyst does not deleteriously affect its activity. From the solution thus obtained, and containing very little sulfate, the metals are reprecipitated, as desired, for the final catalyst, again washed, preferably with distilled water because raw water usually contains sulfate, filtered, dried, ignited, pelleted, and/or otherwise prepared for use. It is not essential that the first precipitate be dissolved in an acid for in some instances the precipitate may be dissolved in ammonia or even in an alkali and then reprecipitated, prior to the final washing, by neutralizing the alkali with the appropriate acid. The steps of washing, drying, igniting, etc. as indicated above are followed in the manner shown.

Another feature of my invention involves the preparation of catalysts from metal salts, other than sulfates, such, for example, as the chlorides, which contain soluble elements or compounds, the presence of which would act as a poison or otherwise lower the value of the finally prepared catalyst in its particular use. The steps of the process are identical with those given, the precipitating and dissolving agents being selected according to the nature and purification of the product desired.

The sole limitation when preparing my preferred chromium-containing catalyst from metal sulfates, by reprecipitation from chromic acid solution, is in the solubility characteristics of the compound formed between the metal and the precipitant. In order to prepare the catalyst in accord with this feature of my process the precipitate must be soluble in the acid designated above, and consequently only the metals, the compounds of which are soluble therein, may be used. These metals include copper, zinc, nickel, cobalt, iron, manganese, cadmium, etc.

The invention will be described in detail in connection with the following examples which illustrate several of the many catalysts which fall within the scope of the invention:

*Example 1.*—250 pounds of copper sulfate ($CuSO_4.5H_2O$) are dissolved in 300 gallons of water and precipitated at 50–60° C. by addition of 200 gallons of a solution containing 106 pounds of sodium carbonate ($Na_2CO_3$). The precipitate is washed by decantation and then dissolved by addition of 100 pounds chromic acid ($CrO_3$) and 84 pounds of nitric acid ($HNO_3$). The volume is made up to 300 gallons with distilled water, the solution is heated with steam to 40° C., and ammonia is added until maximum precipitation is obtained. The precipitate is then washed by decantation with distilled water, filtered, and given whatever further treatment is appropriate for the particular catalytic use to which the material is to be put. The washed precipitate contains less than 0.06% $SO_4$ on the dry basis.

*Example 2.*—251 pounds of zinc sulfate ($ZnSO_4.6H_2O$) are dissolved in 100 gallons of water in a strike tub. To this solution is added, with stirring, 200 gallons of chromate mother liquor obtained after the second precipitation of a preceding batch, as will be pointed out subsequently. The mixture is heated to 40° C., and ammonia is added, while stirring, until maximum precipitation is obtained. The precipitate is allowed to settle and is washed six times by decanting each time a volume of supernatant liquid equal to two-thirds of the total volume of precipitate and liquid. After decantation of the last wash water, 160 pounds of chromic acid are added to the slurry to dissolve it. The chromic acid solution of zinc chromate is then diluted to 300 gallons with distilled water and heated to 40°. Ammonia is then added, while stirring, until maximum precipitation is obtained. The precipitate is allowed to settle until at least two-thirds of the clear mother liquor is pumped over into a tub containing a zinc sulfate solution prepared for the first precipitation of another batch, as mentioned in the second sentence of this example. The reprecipitated material is then washed five times with distilled water by decanting each time a volume of supernatant liquid equal to two-thirds of the total volume of precipitate and liquid. The washed precipitate is then filtered and given whatever further treatment is necessary to put the material into the desired form. The dried precipitate contains less than 0.06% $SO_4$.

*Example 3.*—920 grams of nickel sulfate ($NiSO_4.6H_2O$) are dissolved in sufficient water to give a volume of 1750 cc. 687 cc. of 28.5% aqua ammonia and 354 grams of chromic acid ($CrO_3$) are mixed and diluted to a total volume of 1750 cc. The nickel sulfate is heated to 90° C. and the ammoniacal ammonium chromate solution is added slowly, with stirring, and the mixture finally brought to boiling. The precipitate is allowed to settle and then washed five times by decantation, a volume of supernatant liquid equal to three-quarters of the total volume of precipitate and liquid being removed each time. The precipitate is then filtered and redissolved by admixing with 443 grams of chromic acid ($CrO_3$) and diluting to 3000 cc. with distilled water. This solution is then heated to 90° C. and to it is added with stirring 440 cc. of 28.5% aqua ammonia, and the mixture is then brought to boiling. The precipitate is allowed to settle, washed by decantation with distilled water, and filtered. Analysis of a dried sample showed it to contain less than 0.01% $SO_4$.

The mother liquor added prior to the first precipitation with ammonia is the liquor siphoned from the settled precipitate resulting from reprecipitation with ammonia.

The catalysts prepared in accord with the above examples average not more than .06% $SO_4$, indicating that, from the inexpensive copper, nickel, and zinc sulfates, catalysts substantially free from sulfur may be readily made.

It is, of course, not essential to the operation of my process when preparing the chromate catalysts, in accord with Example 1, that the various steps of the process be effected in the order therein shown. Equally good results may likewise be secured by, for example, adding the metal sulfate solution to an ammonium chromate solution, adding ammonia to a solution of the copper and zinc sulfates and subsequently adding appropriate amounts of chromic acid, or effecting the precipitation of the complex copper-zinc-ammonium chromate by adding ammonium chromate to the zinc and copper sulfate solution. It is likewise further understood that catalysts may be prepared from metal salts containing other anions which are not desired to be present, even in minute quantities, in the finished catalysts, in a manner analogous to the preparation from metal sulfates of catalysts which are substantially free from sulfur-containing compounds. Furthermore, the process is applicable to mixtures containing two or more metals as well as to single metals.

Catalysts prepared in accord with my process may be used in any reaction in which the metal or metals of which they are comprised are suitable as catalysts, for example in the water gas reaction, in methane-steam conversion reaction, in the hydrogenation of vegetable, animal, or mineral oils, and the like.

From a consideration of the above specification it will be realized that any process relating to the preparation of metal catalysts, in accord with the hereinbefore described invention, will come within the scope of the invention without sacrificing any of the advantages that may be derived therefrom.

I claim:

1. In a process of manufacturing catalysts from a soluble metal compound the acid constituent of which is not desired in the finished catalyst, the steps which comprise precipitating compounds of the metals from solution of the soluble metal compounds, washing the precipitate, dissolving the washed precipitate, reprecipitating the compounds of the metals from solution, washing the resulting precipitate, and preparing the catalyst in the usual manner from the last precipitate which contains substantially none of the undesired constituent originally present in the metal compound.

2. In a process of manufacturing catalysts from a soluble metal compound the acid constituent of which is not desired in the finished catalyst, the steps which comprise precipitating compounds of the metals from a solution of the original soluble metal compounds, washing the precipitate, dissolving the washed precipitate in a solvent therefore which does not undesirably contaminate the finished catalyst, reprecipitating compounds of the metals from the solution, washing the resulting precipitate, and preparing the catalyst in the usual manner from the last precipitate which contains substantially none of the undesired constituent originally present in the metal compound.

3. In a process of manufacturing catalysts from a soluble metal compound the acid constituent of which is not desired in the finished catalyst, the steps which comprise precipitating a compound of the metal from a solution of the original metal compound, washing the precipitate, dissolving the washed precipitate in an acid which will not contaminate undesirably the finished catalyst, reprecipitating a compound of the metal from solution, washing the resulting precipitate, and preparing the catalyst from the final precipitate whereby a catalyst is obtained which contains substantially none of the undesired constituent originally present in the metal compound.

4. In a process of manufacturing catalysts from a soluble metal compound the acid constitutent of which is not desired in the finished catalyst, the steps which comprise precipitating a compound of the metal from a solution of the original metal compound with a precipitant selected from the following group comprising ammonia, a soluble hydroxide, a soluble carbonate, a soluble chromate, and a soluble oxalate, washing the precipitate, dissolving the washed precipitate, reprecipitating a compound of the dissolved metal from solution, washing the resulting precipitate, and preparing the catalyst from the latter precipitate which contains substantially none of the undesirable constituent.

5. In a process of manufacturing catalysts containing substantially no sulfur compounds from metal sulfates, the steps which comprise precipitating compounds of the metals from a solution of the metal sulfates, washing the resulting precipitate, dissolving the washed precipitate in an acid which will not undesirably contaminate the finished catalyst, reprecipitating compounds of the metals from the resulting solution, washing the precipitate thus obtained, and preparing from the resulting precipitate the catalyst which contains substantially no sulfur compound.

6. In a process of manufacturing catalysts containing copper, zinc, and chromium from copper sulfate, zinc sulfate, and chromic acid, the steps which comprise adding chromic acid to an aqueous solution of the copper and zinc sulfates, precipitating basic chromates of the metals from that solution with ammonia, washing the precipitate, redissolving it with chromic acid, reprecipitating the resulting chromic acid solution of the metals with ammonia, washing the thus reprecipitated basic chromates and finally filtering, drying, and igniting the resulting copper-zinc-chromium precipitate which is substantially free from sulfur compounds to prepare the catalyst.

7. In a process for manufacturing chromium-containing catalysts from soluble metal compounds containing constituents which are not desired in the finished catalyst, the steps which comprise adding to a solution of the soluble metal compounds the chromate-containing mother liquor from a prior catalyst preparation, precipitating compounds of the metals from solution of the soluble metal compounds, washing the precipitate, dissolving the washed precipitate in chromic acid, reprecipitating the compounds of the metals from solution, washing the resulting precipitate, and forming the catalyst from the last precipitate which contains substantially none of the undesired constituents originally present in the metal compounds.

8. In a process of manufacturing chromium-containing catalysts containing substantially no sulfur compounds from metal sulfates, the steps which comprise precipitating compounds of the metals from a solution containing the metal sulfate and a chromate, washing the resulting precipitate, dissolving the washed precipitate in chromic acid, reprecipitating compounds of the metals from the resulting solution, washing the precipitate thus obtained, and forming from the resulting precipitate, the catalyst which contains substantially no sulfur compounds.

9. In a process of manufacturing chromium-containing catalysts which contain substantially no sulfur compounds from metal sulfates and chromic acid the steps which comprise precipitating a compound of the metals from a solution of the metal sulfates, washing the resulting precipitate, dissolving the washed precipitate in chromic acid, reprecipitating the compounds of the metals from the resulting solution, washing the precipitate thus obtained and forming from the resulting precipitate, the catalyst which contains substantially no sulfur compounds.

10. In a process of manufacturing chromium-containing catalysts substantially free from sulfur compounds from a soluble chromate and metal sulfates, the steps which comprise adding to a solution of the metal sulfate the chromate containing mother liquor from a prior catalyst preparation process, precipitating the compounds of the metals from the resulting solution, washing the precipitate, dissolving the washed precipitate in chromic acid, reprecipitating the compounds of the resulting solution, washing the precipitate thus obtained, and forming from the resulting precipitate a catalyst containing substantially no sulfur compounds.

11. In a process of manufacturing a copper chromite catalyst from copper sulfate and chromic acid the steps which comprise adding chromic acid to an aqueous solution of copper sulfate, precipitating a basic chromate of copper from the solution with ammonia, washing the precipitate, redissolving it with chromic acid, reprecipitating the resulting chromic acid solution of copper with ammonia, washing the thus reprecipitated basic chromate of copper, and finally filtering, drying, and igniting to a copper chromite which is obtained substantially free from sulfure containing compounds.

12. In a process of manufacturing a zinc chromite catalyst from zinc sulfate and chromic acid the steps which comprise adding chromic acid to an aqueous solution of zinc sulfate, precipitating basic zinc chromate from the solution with ammonia, washing the precipitate, redissolving with chromic acid, reprecipitating the resulting chromic acid solution of zinc with ammonia, washing the resulting basic chromate of zinc and finally filtering, drying, and igniting to a zinc chromite to prepare the catalyst substantially free from sulfur compounds.

13. In a process of manufacturing a nickel chromite catalyst from nickel sulfate and chromic acid, the steps which comprise adding chromic acid to an aqueous solution of the nickel sulfate, precipitating the basic nickel chromate from the solution with ammonia, washing the precipitate, redissolving it with chromic acid, reprecipitating the resulting chromic acid solution of nickel with ammonia, washing the thus reprecipitated basic chromate of nickel, and finally filtering, drying, and igniting to a nickel chromite precipitate to obtain a catalyst substantially free from sulfur compounds.

WALTER E. VAIL.